United States Patent [19]
Steinke et al.

[11] Patent Number: 5,374,822
[45] Date of Patent: Dec. 20, 1994

[54] OPTICAL TRANSMITTER FOR PRODUCING AN OPTICAL SIGNAL INDICATIVE OF TEMPERATURE

[75] Inventors: Leo Steinke, Hegnach; Herbert Lang, Bietigheim, both of Germany

[73] Assignee: Robert Bosch GmbH, Stuttgart, Germany

[21] Appl. No.: 691,052

[22] PCT Filed: Jan. 24, 1989

[86] PCT No.: PCT/EP89/00066

§ 371 Date: Jun. 24, 1991

§ 102(e) Date: Jun. 24, 1991

[87] PCT Pub. No.: WO90/08948

PCT Pub. Date: Aug. 9, 1990

[51] Int. Cl.$^5$ .............................................. G01D 5/34
[52] U.S. Cl. ................................. 250/231.1; 374/176
[58] Field of Search .................. 250/231.1; 355/212; 374/144, 176, 177; 359/181, 188

[56] References Cited

U.S. PATENT DOCUMENTS 4,697,920 10/1987 Palm et al. .......................... 355/212
5,270,538 1/1994 Wlodarczyk et al. ............ 250/231.1

FOREIGN PATENT DOCUMENTS 7001121 1/1970 Germany .
2512634 1/1976 Germany .

Primary Examiner—David C. Nelms
Assistant Examiner—Khaled Shami
Attorney, Agent, or Firm—Michael J. Striker

[57] ABSTRACT

An optical transmitter for converting a thermocouple voltage into an optical pulse train and a low pass input filter are contained in respective spaces in a soft magnetic housing. The input filter is in lead wires from a thermocouple whose hot junction is embedded in the tip of the insulator of a spark plug of an internal combustion engine. The housing itself forms part of or is connected to the H.T. lead to the centre electrode of the spark plug. The housing is surrounded by insulating material which is itself surrounded by an earthed screening casing. The low pass filter is symmetrically constructed, both electrically and mechanically.

The filter prevents interference from reaching the circuitry of the optical transmitter and the housing and the casing prevents the generation and transmission of radio interference.

11 Claims, 3 Drawing Sheets

OPTICAL TRANSMITTER FOR PRODUCING AN OPTICAL SIGNAL INDICATIVE OF TEMPERATURE

BACKGROUND OF THE INVENTION

The present invention relates to an optical transmitter for producing an optical signal indicative of the temperature of a component, such as a spark plug, operating under high tension. Such an optical transmitter is known (DE-C-2512634). The thermoelectric voltage from a hot junction on the tip of the insulator of the spark plug is applied to a voltage controlled oscillator (VCO) whose output frequency is thus dependent on and preferably proportional to the temperature to be measured. The oscillator output is fed to a light-emitting diode (LED) and the resulting pulsed optical signal is transmitted along an optical conductor to a light sensitive semi-conductor component where it is re-converted to an electrical signal. The electrical signal can be processed for further use, such as for the digital or analog display of the temperature or for appropriate control of the operation of the internal combustion engine to which the spark plug is fitted. The optical conductor electrically isolates the optical transmitter and thereby the thermoelectric element and its lead wires from the processing circuitry. Thereby the risk of arcing between the centre electrode of the spark plug and the thermo-electric element and its lead wires is minimized. By arranging the optical transmitter as close to the spark plug as possible, the radiation of interference and the capacitive loading on the ignition system are minimized. However, the sparks produced at the spark plug themselves have a very high frequency component ($<10^9$ Hz) and this can interfere with the evaluation of the measured voltage.

SUMMARY OF THE INVENTION

Accordingly, it is an object of the present invention to provide an optical transmitter which avoids the disadvantages of the prior art.

In keeping with these objects and with others which will become apparent hereinafter, one feature of the present invention resides, briefly stated, in an optical transmitter for producing an optical signal indicative of the temperature of a component, such as a spark plug, operating under high tension, wherein a voltage dependent on the temperature to be measured, such as a thermoelectric voltage from a thermocouple hot junction in the component whose temperature is to be measured, is converted into an optical signal which is transmitted along an optical conductor to a light sensor, wherein in accordance with the invention the lead wires which transmit the temperature-dependent voltage are connected to an optical transmitter via a low pass filter which is contained within a housing of ferromagnetic material and the housing is held at the high tension at which the component, whose temperature is to be measured, stands, and is itself surrounded by insulating material.

The low pass input filter prevents the high frequency interference from reaching the VCO or other circuitry of the optical transmitter and the ferromagnetic housing screens any interference radiation from the filter itself. Interference suppression is thus very effective.

Filtering of the high frequency interference is further improved by constructing the low pass filter electrically and mechanically symmetrical. In particular, the low pass filter is electrically symmetrical with respect to the ferromagnetic housing. The low pass filter can comprise at least one capacitor between the lead wires and at least one respective capacitor between each lead wire and the ferromagnetic housing. It can include a respective inductance in each of the lead wires. Filtering is also improved by the use of lead-through capacitors between the filter and the VCO.

To avoid radiation of interference from the ferromagnetic housing, an outer casing can be provided. The outer casing can be formed as a metallic outer casing coupled at earth potential. The metallic outer casing at least where it surrounds the insulating material on the ferromagnetic housing of the low pass filter can be constructed symmetrically.

Faulty readings can be further avoided by arranging the components of the optical transmitter, including a battery, within a separate ferromagnetic housing.

A particularly convenient arrangement is achieved when the ferromagnetic housing or housings is or are incorporated in the high tension lead to the component, and the high tension lead contains or comprises an interference suppressor resistance between the spark plug and the ferromagnetic housing of the low pass filter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1A is a fragmentary detail of a modification in which the optical transmitter is connected to a branch from the H.T. lead.

Figure 1:
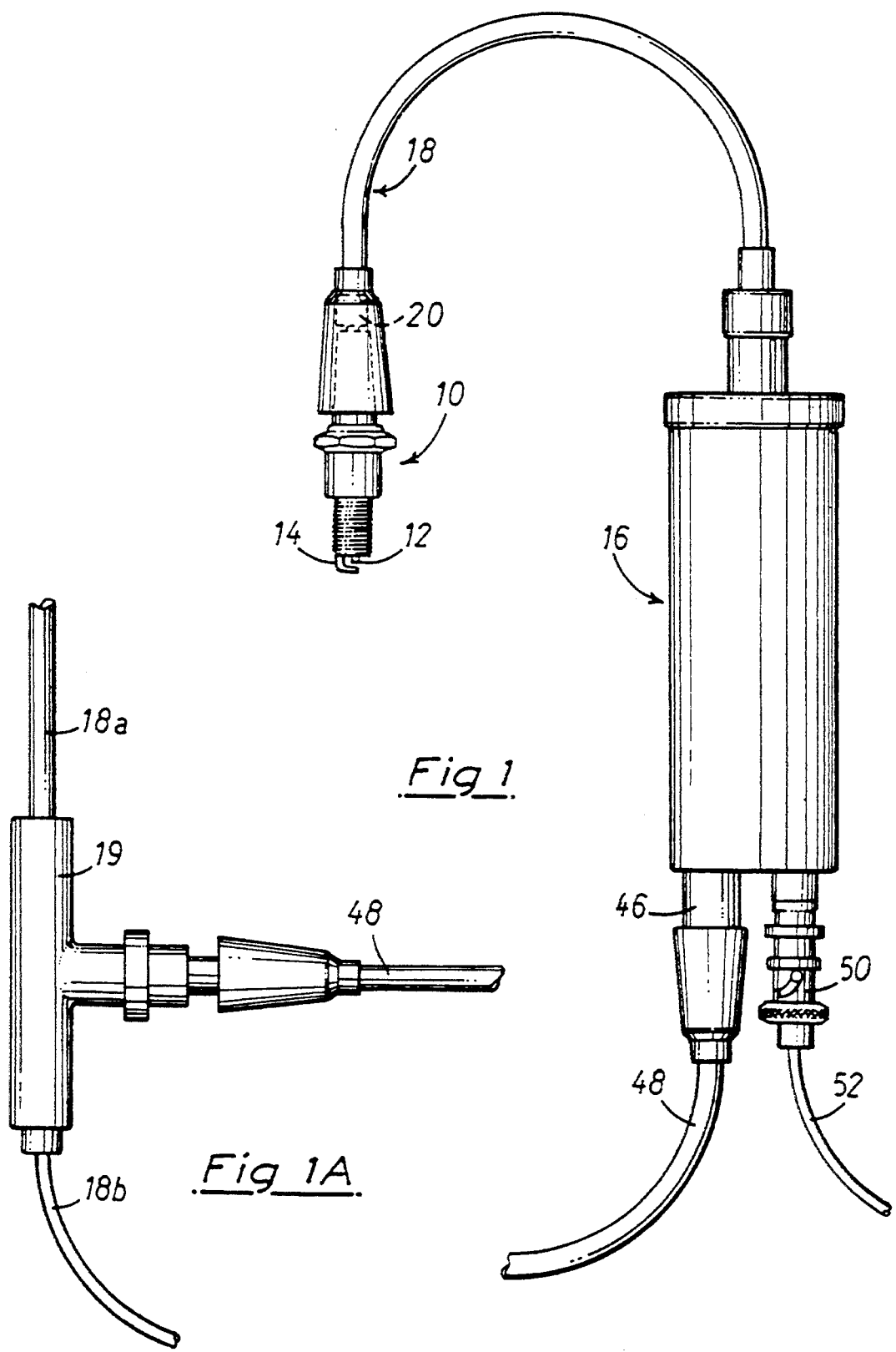
FIG. 1 is a somewhat diagrammatic representation of a spark plug of an internal combustion engine and its H.T. lead with an optical transmitter in accordance with the invention arranged in the H.T. lead for converting the temperature of the spark plug, as measured by a thermocouple, into an optical signal.

DESCRIPTION OF THE PREFERRED EMBODIMENT.

A spark plug 10 for an internal combustion engine has a hot junction of a thermocouple embedded in or disposed on the tip of its insulator (not shown) adjacent a centre electrode 12 which co-operates with an earthed outer electrode 14. The H.T. distributor lead to the spark plug contains an optical transmitter 16 whose circuitry and construction will be described with reference to FIGS. 2 and 3. An insulated cable 18 extends between the optical transmitter 16 and the spark plug 10 and is releasably attached thereto by a 3-pole snap-on connector 20 (shown diagrammatically). The cable 18 contains the H.T. lead wire for the centre electrode 12 and two lead wires for the thermocouple. The H.T. lead wire contains or consists of a suppressor resistor for suppressing interference generated in the spark plug. The insulated 18 is surrounded by a metallic sheath which is electrically earthed to the spark plug housing. A lead 48 from the distributor is connected to the optical transmitter 16.

In the modification of FIG. 1A the insulated cable is split into two portions 18a and 18b between which is a T-connector 19. The lead 48 from the distributor is connected to the T-connector 19 so that the optical transmitter is not actually contained in the H.T. distributor lead but is connected thereto.

The arrangement of the hot junction of the thermocouple in the tip of the spark plug insulator can be as described in DE-U-7001121 with the insulated lead wires from the hot junction extending through the centre hole in the insulator alongside the centre electrode rod. Because of the close proximity of the thermocouple junction to the spark and of its lead wires to the centre electrode, the lead wires pick up the high frequency oscillations from the spark and the lead wires must be at the H.T. potential of the centre electrode to avoid arcing. Thus, according to the preferred embodiment of the invention, the optical transmitter 16 has a low pass input filter and this filter, together with the optical transmitter, are disposed in separate compartments in a housing of soft ferromagnetic material.

Figure 2:
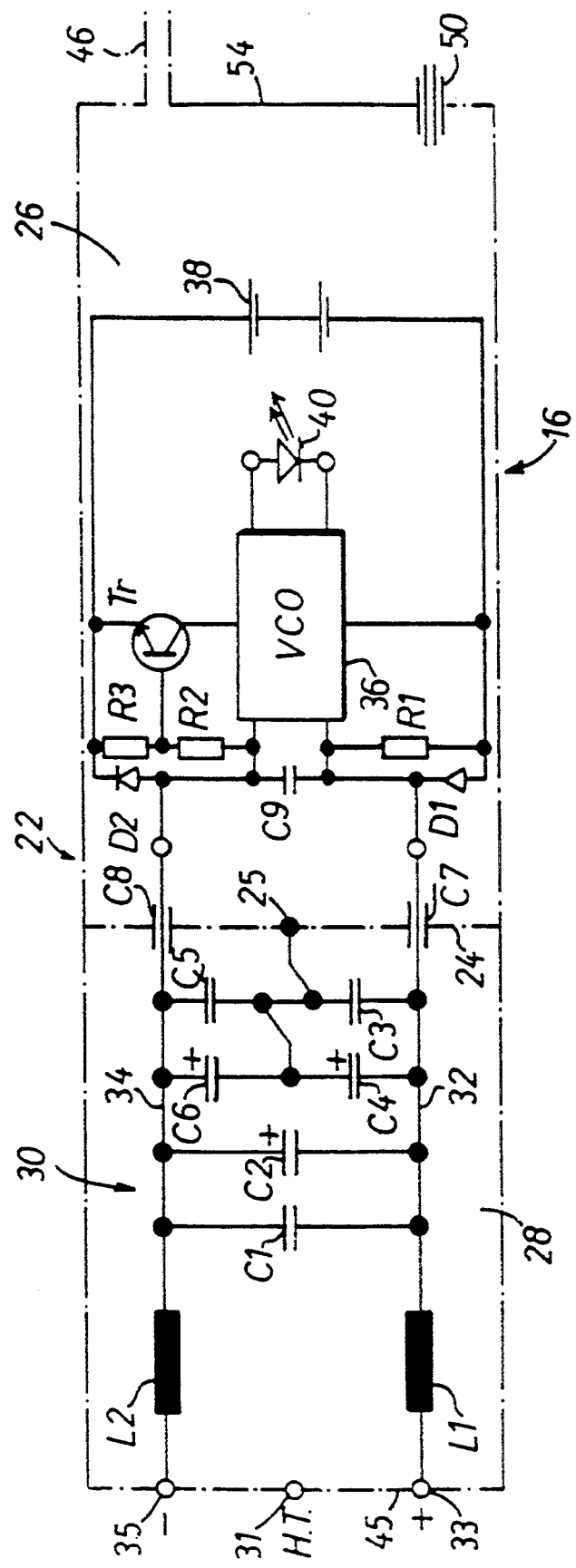
FIG. 2 is a circuit diagram of the optical transmitter and its low pass input filter in accordance with the invention.
Figure 3:
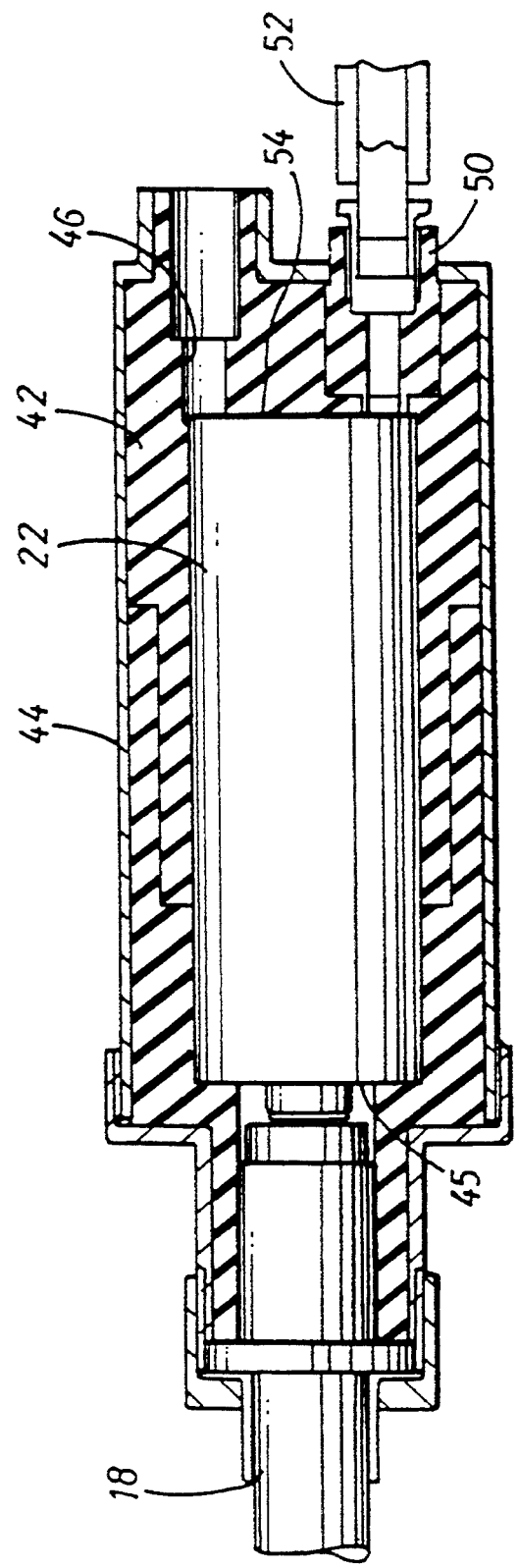
FIG. 3 is a longitudinal section of the housing and casing for the optical transmitter and the low pass filter.

As shown diagrammatically in FIG. 2 and constructionwise in FIG. 3, a composite inner housing 22 of soft ferromagnetic material is divided by a partition 24 to form a space 26 for a circuitry and a power source of the optical transmitter 16 itself and a space 28 for a low pass input filter 30.

The low pass filter 30 comprises inductances L1, L2 arranged respectively in thermoelement lead wires 32,34, capacitors C1 and C2 connected in parallel between the lead wires 32, 34, capacitors C3 and C4 connected in parallel between the lead wire 32 and the housing 22 and capacitors C5 and C6 connected between the lead wire 34 and the inner housing 22. The filter 30 is made as symmetrical as possible, both electrically and mechanically. Thus the capacitors C1, C3 and C5 are of the same value, the capacitors C2, C4 and C6 are of the same value and the inductances L1 and L2 are of the same value. The lead wires 32,34 pass from the space 28 to the space 26 through lead-through capacitors C7 and C8 in the soft ferromagnetic housing partition 24. The capacitors C7 and C8 are of equal capacity and are symmetrically disposed in the housing partition 24. The capacitors C3, C4, C5 and C6 are connected to a common junction 25 on the housing partition 24 between the lead-through capacitors C7 and C8. The junction 25 is at the same H.T. potential as the terminal 31 by which the H.T. lead wire in cable 18 is connected to the one wall 45 of the inner housing 22, the terminal 31 being physically disposed between the terminals 33,35 for the thermoelement lead wires 32 and 34.

The thermoelectric voltage between the lead wires 32, 34 is used to control the frequency of a VCO 36 disposed in the space 26 together with its power source in the form of rechargeable batteries 38 and an LED 40 which is energised by a square wave output from the VCO 36. Preferably, the output frequency of the VCO is directly proportional to its control voltage. Thereby the pulse frequency of the optical signal produced by the LED 40 is directly proportional to the temperature of the insulator tip of the spark plug, insofar as the thermoelement itself has a linear response.

As shown in FIG. 3, the soft ferromagnetic composite or combined inner housing 22 in cylindrical and the soft ferromagnetic partition 24 extends tranversely of the housing axis. The inner housing 22 is at the H.T. potential by virtue of the H.T. lead wire being connected to the terminal 31. The inner housing 22 is surrounded by a two-piece insulator 42 which is itself surrounded by a cylindrical metallic outer housing or casing 44. The optical transmitter 16 is mounted on the engine block, whereby the metallic outer casing 44 is earthed. The insulator 42 has a low dielectric constant so that the capacitance between the outer casing 44 and the inner housing 22 is low.

As shown in FIGS. 1 and 3, on end wall 54 of the housing 22 opposite an end wall 45 is provided with a socket 46 for the H.T. distributor lead 48 and with a socket 50 for an optical conductor or light guide 52. In the case of the modification of FIG. 1A, the socket 46 is omitted and the socket 50 can be centrally disposed on an end wall 54. The light guide 52 registers with the LED 40 or alternatively a light guide is provided within the housing 22 between the LED 40 and the socket 50. The optical conductor 52 leads, possibly together with other optical conductors appertaining to the remaining spark plugs of the internal combustion engine, to an optical receiver. The latter may be of a conventional kind as described in DE-C-2512634 and may contains a light sensitive semiconductor element and a processor for processing, its output to operate, for example, a digital display and/or an analog recording of the temperature of the tips of the spark plug insulators.

FIG. 2 shows how a battery 38 may be re-charged by disconnecting the cable 18 from the spark plug and connecting a suitable battery charger to terminals 33,35. When the cable 18 is disconnected from the spark plug, the terminals 33,35 are no longer connected to one another and a capacitor C9 is charged via high resistors R1,R2 and R3. The base of a transistor Tr which feeds the battery power to the VCO is connected to the junction between the resistors R2 and R3. When the capacitor C9 is charged, the transistor Tr is switched off, so disconnecting the VCO from the battery 38. When the battery charger is connected to the terminals 33,35, the battery is charged via diodes D1 and D2.

By way of example, good results can be obtained if L1=L2=1.2 mH, C1=C3=C5 =22 nF, C2=C4=C6=1 µF and C7=C8=2×800 pF. C9=1 µF, R1=2.2MΩ, R2=562KΩ and R3=1MΩ. The optical transmitter 16 may have an outer diameter of 54 mm and an overall length of 183 mm and the connecting cable may be 300 mm long.

Advantages of the invention are the absence of external interference due to the symmetry of the low pass filter with respect to the inner housing, the separation of the spaces or chambers for the low pass filter and for the circuitry of the optical transmitter and the conducting of the measurement signals via lead-through capacitors and the screening of the transmitter by a housing of soft magnetic material. A further advantage is the lowering of the interference level by the symmetrical construction of the transmitter and of the lead to the outer screening and the conduction of the ignition voltage through an interference suppressor resistor.

It will be understood that each of the elements described above, or two or more together, may also find a useful application in other types of constructions differing from the types described above.

While the invention has been illustrated and described as embodied in an optical transmitter for producing an optical signal indicative of a temperature of a component, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An optical transmitter for producing an optical signal indicative of a temperature of a component operating under high tension, wherein a voltage dependent on a temperature to be measured is converted into an optical signal, the optical transmitter comprising an optical conductor along which the optical signal is transmitted to a light sensor; an optical transmitter; lead wires which transmit a temperature-dependent voltage and are connected to said optical transmitter; a low pass filter through which said lead wires are connected to said optical transmitter; a housing of ferromagnetic material in which said low pass filter is contained, said housing being held at a high tension which corresponds to the high tension of the component whose temperature is to be measured; and insulating material surrounding said housing.

2. An optical transmitter as defined in claim 1, wherein said low pass filter is electrically symmetrical with respect to said housing of ferromagnetic material.

3. An optical transmitter as defined in claim 1, wherein said low pass filter is mechanically symmetrical with respect to said housing of ferromagnetic material.

4. An optical transmitter as defined in claim 1, wherein said low pass filter includes at least one capacitor located between said lead wires, and also at least one capacitor located between each of said lead wires and said housing of ferromagnetic material.

5. An optical transmitter as defined in claim 1, wherein said low pass filter includes an inductance in each of said lead wires.

6. An optical transmitter as defined in claim 1, wherein said low pass filter includes lead-through capacitors, said lead wires pass out of said housing of ferromagnetic material at said lead-through capacitors.

7. An optical transmitter as defined in claim 1; and further comprising a metallic outer casing held at a potential and surrounding said insulating material.

8. An optical transmitter as defined in claim 7, wherein said metallic outer casing is symmetrical at least where it surrounds said insulating material.

9. An optical transmitter as defined in claim 1; and further comprising a transmitter having its own power source; and a separate housing of ferromagnetic material accommodating said transmitter and said power source, said separate housing being held at a high tension which correspond to the high tension to which the component temperature to be measured stands; and a further insulating material surrounding said separate housing.

10. An optical transmitter as defined in claim 1; and further comprising an H.T. conductor to said component; and an earthed metallic sheath surrounding said H.T. conductor and said lead wires.

11. An optical transmitter as defined in claim 1; and further comprising a high tension lead to said component provided with an interference suppressor resistance between said component and said housing of ferromagnetic material, said housing of ferromagnetic material being incorporated in said high tension lead.

* * * * *